United States Patent [19]

Loizeau

[11] Patent Number: 4,790,419
[45] Date of Patent: Dec. 13, 1988

[54] CLUTCH WITH DAMPER TYPE FLYWHEEL

[75] Inventor: Pierre Loizeau, Ville D'Avray, France

[73] Assignee: Valeo, Paris, France

[21] Appl. No.: 60,913

[22] Filed: Jun. 12, 1987

[30] Foreign Application Priority Data

Jun. 27, 1986 [FR] France .................. 86 09339

[51] Int. Cl.$^4$ .................. F16F 15/12; F16D 3/14; F16D 3/66
[52] U.S. Cl. .................. 192/70.18; 74/574; 192/89 B; 192/106.2; 464/68
[58] Field of Search .................. 192/48.1, 55, 70.17, 192/70.18, 89 B, 106.2; 74/574; 464/68

[56] References Cited

U.S. PATENT DOCUMENTS

| 4,611,701 | 9/1986 | Friedmann | 192/70.18 X |
| 4,662,239 | 5/1987 | Worner et al. | 74/574 |

FOREIGN PATENT DOCUMENTS

| 0173838 | 3/1986 | European Pat. Off. . |
| 8504809 | 7/1985 | Fed. Rep. of Germany . |
| 55-20964 | 2/1980 | Japan | 74/574 |
| 2171494 | 8/1986 | United Kingdom . |

Primary Examiner—Allan D. Herrmann
Attorney, Agent, or Firm—Charles E. Brown; Charles A. Brown

[57] ABSTRACT

A clutch comprises a flywheel which rotates with a first shaft, a friction disk which rotates with a second shaft, a clutch cover which rotates with the flywheel and a pressure plate which rotates with the cover. The flywheel is movable axially relative to the cover. An axially acting spring device bears on the cover and urges the pressure plate towards the flywheel to clamp the friction disk against the flywheel. The cover comprises a bearing surface, first and second parts rotatable relative to each other and a circumferentially acting spring device which resists any such relative rotation. The first part rotates with the first shaft and comprises a flange constituting a support flange for the clutch. The second part, against which the friction disk bears axially, comprises a plate constituting the reaction plate proper. Within this plate is a torque limiter comprising friction facings and an axially acting spring device for clamping up these friction facings. The torque limiter is operative between the plate and the bearing surface on the cover. The axially acting spring device associated with the friction disk is the same as the axially acting spring device associated with the friction facings of the torque limiter.

6 Claims, 2 Drawing Sheets

CLUTCH WITH DAMPER TYPE FLYWHEEL

BACKGROUND OF THE INVENTION

1. Field of the invention

The present invention is generally concerned with clutches, in particular clutches for automotive vehicles.

2. Description of the prior art

As is well known, a clutch generally comprises a flywheel or reaction plate which is adapted to be constrained to rotate with a first shaft, generally a driving shaft, the motor crankshaft in the case of an automotive vehicle, a friction disk which is adapted to be constrained to rotate with a second shaft, generally a driven shaft, the input shaft of the gearbox in the case of an automotive vehicle, a clutch cover which is constrained to rotate with the flywheel, a pressure plate which is constrained to rotate with the cover and is movable axially relative to the cover, and axially acting spring means which, bearing against the cover, are adapted to urge the pressure plate towards the flywheel to clamp the friction disk against the latter and so engage the clutch.

The present invention is more particularly directed to the case where the flywheel is a damper type flywheel, by which is meant a flywheel within which are incorporated means for damping torsional torques.

As is also well known, in order to filter out vibrations that can arise at any point in the kinematic system that a transmission constitutes, extending from the motor to the axles in an automotive vehicle, it is usual to insert a torsional damper device into the transmission.

This torsional damper device is usually incorporated into the friction disk of the clutch.

It has already been proposed, however, as an alternative to this arrangement, or in conjunction with it, to incorporate a torsional damper device of this kind into the flywheel for certain specific applications, especially for vehicles in which the motor develops a relatively high torque at low rotation speeds, for which a specific requirement is to minimize the so-called "trash" noise which is generated when torque is applied.

A damper type flywheel of this kind generally comprises two parts rotatable relative to each other against circumferentially acting spring means, namely a first part through which it is adapted to be constrained to rotate with the first shaft, meaning the driving shaft in this instance, and which to this end comprises a flange constituting a support flange for the assembly and a second part against which the friction disk is adapted to bear axially and which to this end comprises a plate forming the reaction plate proper facing the friction disk.

In practise a damper type flywheel of this kind itself give rise to a problem because, being formed in two parts and thus comprising two inertial masses between which spring means are operative, it constitutes a resonant assembly in which resonance can occur as a result of the cylindrical loading to which it is subjected.

To alleviate this problem it is usual to incorporate into it a torque limiter with friction facings clamped up by axially acting spring means, this torque limiter being in practice disposed within the second of its constituent parts, by which is meant that comprising the reaction plate proper.

If, as a result of resonance, the damper type flywheel is subjected to a torsional torque that is greater than a predetermined value, chosen so as to be greater in all circumstances than the maximum motor torque that has to be transmitted, slipping occurs inside the relevant part of the damper type flywheel so that parts and equipment on the downstream side are not affected.

In practise the torque limiter with which the damper type flywheel is fitted in this way is operative only on starting and stopping the motor and on relatively rare occasions in response to impulses in the transmission due, for example, to excessively sudden engaging of the clutch.

However, use of a torque limiter of this kind in itself constitutes a problem.

Among other things, it is necessary to adjust the loading, that is to say the axial clamping force exerted by the axially acting spring means that control it, so that, as already mentioned, the corresponding torsional torque is in all circumstances greater than the maximum motor torque to be transmitted.

A general objective of the present invention is an arrangement which makes it possible to circumvent this problem and confers other advantages, at least in the case where it is possible to start up the motor of an automotive vehicle without first disengaging the clutch, which in practise corresponds to a significant fraction of the market.

SUMMARY OF THE INVENTION

In one aspect, the present invention consists of a clutch comprising a flywheel adapted to be constrained to rotate with a first shaft, a friction disk adapted to be constrained to rotate with a second shaft, a clutch cover constrained to rotate with said flywheel, a pressure plate constrained to rotate with said cover and movable axially relative to said cover, and axially acting spring means which bear on said cover and are adapted to urge said pressure plate towards said flywheel so as to clamp said friction disk against said flywheel, wherein said cover comprises a bearing surface, frist and second parts rotatable relative to each other and circumferentially acting spring means adapted to resist such relative rotation, said first part is adapted to be constrained to rotate with said first shaft and comprises a flange constituting a support flange for the assembly, said second part, against which said friction disk is adapted to bear axially, comprises a plate constituting the reaction plate proper and, within said plate, a torque limiter comprising friction facings and axially acting spring means for clamping up said friction facings, said torque limiter is operative between said plate and said bearing surface on said cover, and said axially acting spring means associated with said friction disk also constitute said axially acting spring means associated with said friction facings of said torque limiter.

In practise, the first part of the flywheel comprises a transversely disposed annular member and a secondary friction disk fastened to this member, the friction facings of the torque limiter forming part of the secondary friction disk, and the clutch further comprises a counter-cover having an axial skirt by means of which it is fastened to the cover and, on the side of the secondary friction disk opposite the plate, a transverse annular flange on which the bearing surface is formed.

Apart from the fact that, in an economical way, the same axially acting spring means serve both to load the main friction disk, that is to say that of the clutch, and to load the secondary friction disk, that is to say that of the torque limiter that the damper type flywheel of this clutch comprises, the force applied to the secondary friction disk is always greater than that applied to the main friction disk when the clutch is operated to engage or disengage it.

Due to the reaction of the axially acting spring means in question on the cover, the loading on the secondary friction disk is arrived at from the loading on the main friction disk by adding to this force applied to said axially acting spring means by the corresponding control member when the clutch is operated to engage or disengage it.

The rubbing surfaces having been designed accordingly from the outset, it is certain that for all engagement and disengagement configurations of the clutch the maximum torsional torque that can be transmitted without slipping by the torque limiter is greater than the motor torque transmitted by the main friction disk.

In other words, in the event of any excess torque the corresponding slipping occurs at the main friction disk, in the usual way, and not at the secondary friction disk.

Thus the saving obtained due to the fact that the spring clamping means of the torque limiter are the same as those associated with the main friction disk is not achieved to the detriment of the durability of the torque limiter.

Finally, a result of the arrangement in accordance with the invention is that, when the clutch is operated to disengage it the loading on the torque limiter is lower than the loading on it when the clutch is operated to engage it since the reaction on the cover of the axially acting spring means concerned, which conditions this loading, is then only a fraction of what it is on engaging of the clutch.

In other words, by virtue of the invention the torque limiter is at this time partially offloaded.

As a result, should resonance arise between the two component parts of the damper type flywheel it is able to operate in slipping mode faster and therefore to interrupt any such onset of resonance sooner, which advantageously favors minimizing of the noise likely to be generated on starting up.

A particularly advantageous compromise is also achieved in this way between the ideal, but unrealistic solution whereby the two parts or inertial masses constituting the damper type flywheel would be completely decoupled from each other, which would effectively prevent any possibility of resonance arising between them, but which would not enable the transmission of any torque whatsoever, and the complex, costly and bulky solution consisting in constraining the two parts or inertial masses to rotate together except during phases of operation in which their being separate is indispensible.

In another aspect, the invention consists in a clutch comprising a flywheel adapted to be constrained to rotate with a first shaft, a friction disk adapted to be constrained to rotate with a second shaft, a clutch cover constrained to rotate with said flywheel, a pressure plate constrained to rotate with said cover and movable axially relative to said cover, and axially acting spring means which bear on said cover and are adapted to urge said pressure plate towards said flywheel so as to clamp said friction disk against said flywheel, wherein said cover comprises a bearing surface, first and second parts rotatable relative to each other and circumferentially acting spring means adapted to resist such relative rotation, said first part is adapted to be constrained to rotate with said first shaft and comprises a flange constituting a support flange for the assembly, said second part, against which said friction disk is adapted to bear axially, comprises a plate constituting the reaction plate proper and, within said plate, a torque limiter comprising friction facings and axially acting spring means for clamping up said friction facings, said torque limiter is operative between said plate and said bearing surface on said cover, said axially acting spring means associated with said friction disk also constitute said axially acting spring means associated with said friction facings of said torque limiter, and said friction facings of said torque limiter have a median diameter greater than the median diameter of those of said friction disk.

In a further aspect, the invention consists in a clutch comprising a flywheel adapted to be constrained to rotate with a first shaft, a friction disk adapted to be constrained to rotate with a second shaft, a clutch cover constrained to rotate with said flywheel, a pressure plate constrained to rotate with said cover and movable axially relative to said cover, and axially acting spring means which bear on said cover and are adapted to urge said pressure plate towards said flywheel so as to clamp said friction disk against said flywheel, wherein said cover comprises a bearing surface, first and second parts rotatable relative to each other and circumferentially acting spring means adapted to resist such relative rotation, said first part is adapted to be constrained to rotate with said first shaft and comprises a flange constituting a support flange for the assembly, said second part, against which said friction disk is adapted to bear axially, comprises a plate constituting the reaction plate proper and, within said plate, a torque limiter comprising friction facings and axially acting spring means for clamping up said friction facings, said torque limiter is operative between said plate and said bearing surface on said cover, said axially acting spring means associated with said friction disk also constitute said axially acting spring means associated with said friction facings of said torque limiter, and said friction facings of said torque limiter and those of said friction disk have different coefficients of friction.

The characteristics and advantages of the invention will emerge from the following description given by way of example and with reference to the appended diagrammatic drawings.

DESCRIPTION OF THE PREFERRED EMBODIMENT

Figure 1:
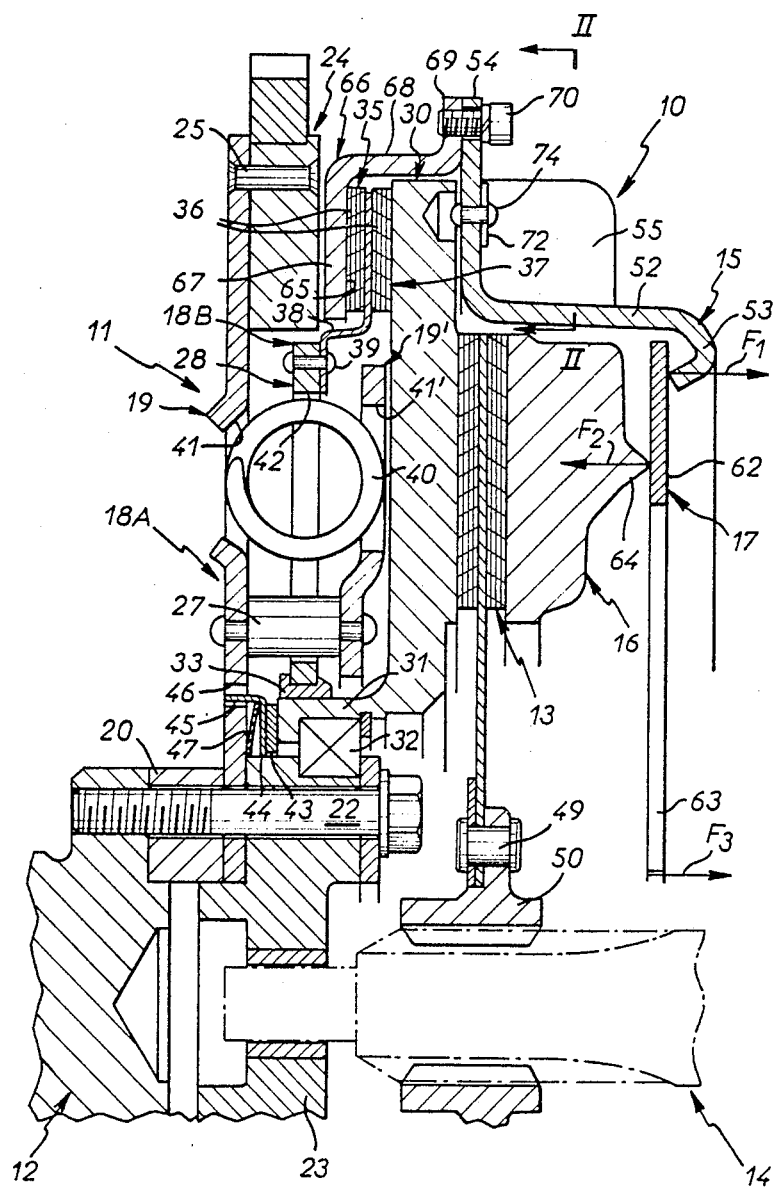
FIG. 1 is a partial view in axial cross-section of a clutch in accordance with the invention.
Figure 2:
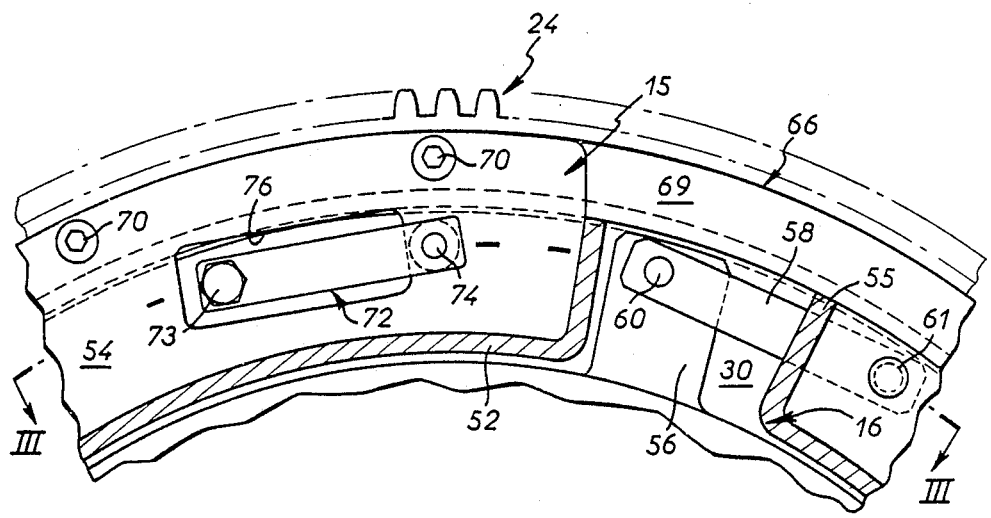
FIG. 2 is a partial view of this clutch in elevation and in cross-section on the line II—II in FIGS. 1 and 3.
Figure 3:
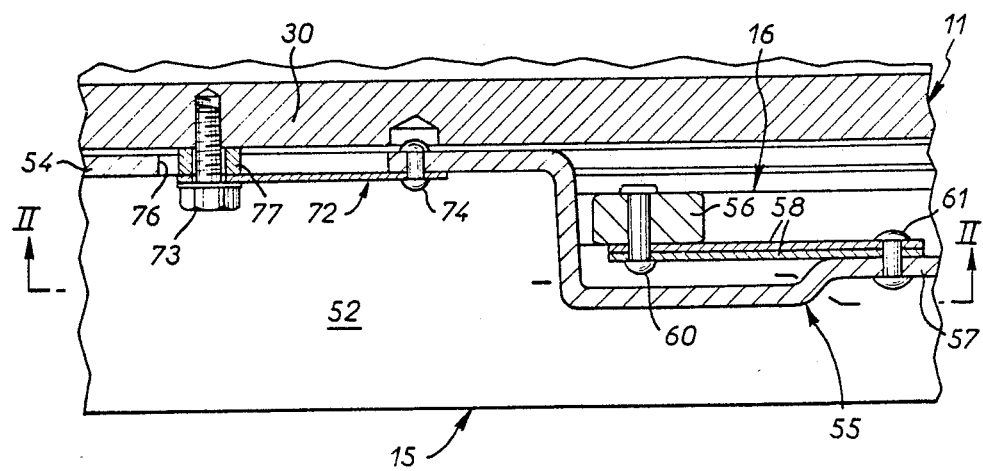
FIG. 3 is a partial view of it in circumferential cross-section on the curved line III—III in FIG. 2.

As shown in the figures the clutch 10 in accordance with the invention comprises a flywheel 11, or reaction plate, which is adapted to be constrained to rotate with a first shaft 12, in general a driving shaft and in practise, in the case where the clutch is fitted to an automotive vehicle, the crankshaft of the motor thereof, a friction disk 13 which, as schematically represented in dashed outline in FIG. 1, is adapted to be constrained to rotate with a second shaft 14, generally a driven shaft and in practise, in the case of a clutch fitted to an automotive vehicle, the input shaft of the gearbox, a clutch cover 5 which is constrained to rotate with the flywheel 11, a pressure plate 16 which is constrained to rotate with the cover 15, and axially acting spring means 17 which, bearing against the cover 15, are adapted to urge the pressure plate 16 towards the flywheel 11, to clamp the friction disk 13 against the latter.

The flywheel 11 itself comprises two parts rotatable relative to each other against circumferentially acting spring means, namely a first part 18A through which it is adapted to be constrained to rotate with the shaft 12 and a second part 18B against which the friction disk 13 is adapted to bear axially.

To constrain it to rotate with the shaft 12 the part 18A comprises a transverse annular flange 19 forming a support flange for the assembly.

At its inside periphery and through the intermediary of an interposed spacer washer 20 the annular flange 19 is attached to the shaft 12 by screws 22 which also serve to attach to the shaft 12 a hub 23 forming at its periphery a bearing for the other part 18B of the flywheel 11 and forming axially a bearing for the shaft 14.

At its outside periphery the annular flange 19 carries a starter ring 24 attached by rivets 25.

The part 18A of the flywheel 11 comprises a second annular flange 19' generally parallel to but smaller than the previously mentioned annular flange 19, in the radial direction and fastened to the annular flange 19 by the axial spacers 27.

The spacers 27 are disposed at the inside edge of the annular flange 19' and therefore in the vicinity of the inside edge of the annular flange 19.

The part 18B of the flywheel 11 comprises a transverse annular flange 28 disposed axially between the annular flanges 19, 19' of the part 18A.

It also comprises a plate 30 forming the reaction plate proper against which the main friction disk 13 bears axially.

The plate 30 is fastened to a hub 31 which is coaxial with the previously mentioned hub 23, with a bearing 32 disposed between them.

A bearing 33 mounted between the hub 31 and the annular flange 28 is able to slide axially on the hub so that the flange 28 is able to rotate about the axis of the assembly and move axially along it.

Within the part 18B, as will be described in more detail later, there is a torque limiter 35 comprising friction facings 36.

The friction facings 36 of the torque limiter 35 form part of a secondary friction disk 37 which has a flange 38 attached by rivets 39 to the outside edge of the annular flange 28.

For reasons of construction the flange 38 of the secondary friction disk 37 is bent twice, in opposite directions, its friction facings 36 being offset axially relative to its inside edge.

In a way that is known in itself, and by virtue of arrangements which will not be described in more detail here for this reason, the circumferentially acting spring means operative between the two parts 18A, 18B of the flywheel 11 comprise a plurality of helical coil springs 40 all disposed substantially tangentially to a common circumference of the assembly and each disposed in an individual housing formed partly by openings 41, 41' formed for this purpose in the annular flanges 19, 19' of the part 18A and partly by openings 42 provided for this purpose in the annular flange 28 of the part 18B.

Friction means are also operative between the parts 18A, 18B.

They comprise a friction ring 43 carried by a support ring 44 constrained by axial lugs 45 to rotate with the annular flange 19, the axial lugs 45 being to this end axially inserted into openings 46 in the flange; the friction ring 43 is urged against the edge of the hub 31 by spring means comprising a Belleville type spring washer 47 operative between the support ring 44 and the annular flange 19.

The main friction disk 13 is of the usual type.

At its inside edge it is attached by rivets 49 to a hub 50 adapted to be constrained to rotate with the shaft 14 by an arrangement of splines.

In the known way the cover 15 is a generally annular part comprising a substantially axial skirt 52 surrounding the friction disk 13 and the pressure plate 16 and having, at the axial end of the skirt 52 opposite the flywheel 11, a lip 53 extending radially away from the axis of the assembly, for the axially acting spring means 17 to bear against; at the other end of the skirt 52, that near the flywheel 11, it has a rim 54 extending radially away from the axis and featuring, for reasons that will emerge hereinafter, spaced louvers 55 set back relative to its main part, whereby the radial dimension is reduced in line with these louvers 55.

In the known way, the pressure plate 16 is a generally annular part having radial lugs 56 aligned with the louvers 55 on the cover 15 by means of which it is constrained to rotate with the cover 15, each of the lugs 56 being coupled to a land 57 on a louver 55 by a set of one or more elastically deformable tangs 58 substantially tangential to a circumference of the assembly, inside the volume delimited by the cover 15 and fixed at one end by a rivet 60 to a lug 56 and at the other end by a rivet 61 to a land 57.

In the known way the axially acting spring means 17 comprise a diaphragm spring, that is to say a spring washer whose circumferentially continuous peripheral part 62 forms a Belleville spring washer and whose central part is divided into radial fingers 63 by slots, the radial fingers 63 forming clutch release levers adapted to have their ends acted on by a control member (not shown), in practise a clutch release bearing, in order to disengage the clutch.

The clutch 10 shown here is of the so-called "pull" type, that is to say a clutch in which, in order to disengage the clutch, the control member has to operate in traction, that is to say in the direction away from the flywheel 11, on the fingers 63 of the diaphragm spring constituting the axial acting spring means 17.

Thus the circumferentially continuous part 62 of this diaphragm spring, which is that through which it is adapted to operate on the pressure plate 16, bearing against the cover 15, bears on the pressure plate 16, in practise on an axially projecting annular bead 64 on the latter. It does so on a circumference of smaller diameter than the circumference along which it bears on the rim 53 of the cover 15.

In accordance with the invention, the torque limiter 35 is operative between the reaction plate proper 30, on the side thereof facing away from the main friction disk 13, and a bearing surface 65 that is fast with the cover 15 at least in the axial direction, whereby the axially acting spring means 17 associated with the main fricion disk 13 also constitute the axially acting spring means associated with the friction facings 36 of the torque limiter 35, that is to say with the secondary friction disk 37 that the torque limiter 35 comprises.

The bearing surface 65 associated with the secondary friction disk 37 is part of a counter-cover 66 which has, on the side of the secondary friction disk 37 opposite the reaction plate 30, a transverse annular flange 67 extending radially towards the axis of the assembly and on which is formed the bearing surface 65 associated with the secondary friction disk 37, and an axial skirt 68 extending radially beyond the secondary friction disk 37 and the reaction plate proper 30, by means of which it is attached to the cover 15.

Thus the bearing surface 65 associated with the secondary friction disk is coupled both circumferentially and axially to the cover 15.

At the end opopsite the annular flange 67 the skirt 68 of the counter-cover 66 has a rim 69 extending radially away the axis of the assembly, butted up against the rim 54 on the cover 15 and attached to the latter from place to place by screws 70, at locations where the rim 54 extends to its full radius.

The cover 15 is constrained to rotate with the flywheel 11, relative to which it is axially mobile, through the intermediary of the reaction plate proper 30 and by means of elastically deformable tangs 72 all of which are substantially tangential to a common circumference of the assembly and each of which is fastened at one end by a screw 73 to the reaction plate proper 30 and at the other end by a rivet 74 to the rim 54 of the cover 15.

The elastically deformable tangs 72 lie outside the volume delimited by the cover 15 and the screws 73 pass through the rim 54 of the latter by means of openings 76 provided for this purpose in the rim 54, a tubular spacer 77 being provided between each screw and the reaction plate proper 30 to compensate for the axial thickness of the rim 54.

In accordance with the invention, and as a result of what has been described previously, the cover 15 and the counter-cover 66 fastened to it together constitute an assembly movable axially relative to the flywheel 11 with, disposed between the rim 54 of the cover and the annular flange 67 of the counter-cover 66, on the one hand, the peripheral part of the reaction plate proper 30 forming part of the flywheel 11 and, on the other hand, the friction facings 36 of the friction disk 37 of the torque limiter 35 adapted to cooperate with the latter.

For the engaged configuration of the clutch, that is to say when the control member associated with the diaphragm spring constituting the axially acting spring means 17 is not acting on it, the diaphragm spring bears against the cover 15, as shown by the arrow F1 in FIG. 1, so as to urge the pressure plate 16 towards the reaction plate proper 30 of the flywheel 11, which is fixed in the axial direction, as shown by the arrow F2 in FIG. 1; as a result the friction disk 13 is effectively clamped between the pressure plate 16 and the reaction plate proper 30.

At the same time, however, and by virtue of the axial mobility of the assembly comprising the cover 15 and the counter-cover 66, the diaphragm spring constituting the axially acting spring means 17 also urges the annular flange 67 of the counter-cover 66 towards the reaction plate proper 30 of the flywheel 11, so that the friction disk 37 to which the friction facings 36 of the torque limiter 35 belong is also clamped between the reaction plate proper 30 and the annular flange 67.

The arrangement is such that the maximum torsional torque that can be transmitted by the torque limiter 35 is greater than the maximum motor torque that has to be transmitted by the clutch; to this end the friction facings 36 of the torque limiter 35 have a median diameter greater than that of the friction facings of the main friction disk 13.

Thus if slipping occurs ti can only do so at the main friction disk 13.

When, as shown by the arrow F3 in FIG. 1, a force is applied to the fingers 63 of the diaphragm spring constituting the axially acting spring means 17 in order to disengage the clutch, the force exerted by the diaphragm spring on the pressure plate 16, as shown by the arrow F2, is reduced, as is the reaction force applied to the cover 15 by the diaphragm spring, as shown by the arrow F3, the absolute sum of the forces F3+F2 being always greater than the force F1.

Relieved of part of the loading normally applied to it, the torque limiter 35 is advantageously able to operate more securely and more quickly when needed, that is to say in the event of resonance arising between the two parts 18A, 18B of the flywheel 11.

However, when the clutch is operated to disengage it, the loading on the torque limiter 35 remains at all times greater than the loading to which the main friction disk 13 is subjected.

The same applies when the clutch is operated to engage it.

It is to be understood that the present invention is not limited to the embodiment described and shown herein, but encompasses any variant execution thereof.

Specifically, the coefficients of friction of the friction facings may be different, instead of or in conjunction with the arrangement whereby those of the torque limiter have a larger median diameter than those of the main friction disk.

Also, although specifically described with reference to a "pull" type clutch the present invention is equally applicable, subject to the adoption of appropriate specific arrangements, to a "push" type clutch, by which is meant a clutch in which, in order to disengage the clutch, the control member concerned has to push on the fingers of the diaphragm spring constituting the axially acting spring means used, or on the corresponding clutch release means.

I claim:

1. Clutch comprising a flywheel adapted to be constrained to rotate with a first shaft, a friction disk adapted to be constrained to rotate with a second shaft, a clutch cover constrained to rotate with said flywheel, a pressure plate constrained to rotate with said cover and movable axially relative to said cover, and axially acting spring means bearing on said cover and adapted to urge said pressure plate towards said flywheel for clamping said friction disk against said flywheel, said cover having a bearing surface, said flywheel comprising first and second parts rotatable relative to each other and circumferentially acting spring means being adapted to resist such relative rotation, said first part being adapted to be constrained to rotate with said first shaft and including a flange constituting a support flange for the clutch, said second part against which said friction disk is adapted to bear axially, comprising a plate constituting the reaction plate proper and, a torque limiter comprising friction facings and axially acting spring means for clamping up said friction facings, said torque limiter being operative between said plate and said bearing surface on said cover, and said axially acting spring means associated with said friction disk also constituting said axially acting spring means associated with said friction facings of said torque limiter.

2. Clutch according to claim 1, wherein said second part of said flywheel comprises a transversely disposed annular member and a secondary friction disk fastened to said member and said friction facings of said torque limiter form part of said secondary friction disk, and further comprising a counter-cover having an axial skirt by means of which it is fastened to said cover and, on the side of said secondary friction disk opposite said plate, a transverse annular flange on which said bearing surface is formed.

3. Clutch according to claim 2, wherein said cover and said counter-cover together form an assembly movable axially relative to said flywheel.

4. Clutch according to claim 3, further comprising elastically deformable tangs by means of which said cover is constrained to rotate with said plate of said flywheel.

5. Clutch comprising a flywheel adapted to be constrained to rotate with a first shaft, a friction disk adapted to be constrained to rotate with a second shaft, a clutch cover constrained to rotate with said cover and movable axially relative to said cover, and axially acting spring means bearing on said cover and adapted to urge said pressure plate towards said flywheel for clamping said friction disk against said flywheel, said cover having a bearing surface, said flywheel comprising first and second parts rotatable relative to each other and circumferentially acting spring means adapted to resist such relative rotation, said first part being adapted to be constrained to rotate with said first shaft and including a flange constituting a support flange for the clutch, said second part, against which said friction disk is adapted to bear axially, comprising a plate constituting the reaction plate proper and, a torque limiter comprising friction facings and axially acting spring means for clamping up said friction facings, said torque limiter being operative between said plate and said bearing surface on said cover, said axially acting spring means associated with said friction disk also constituting said axially acting spring means associated with said friction facings of said torque limiter, and said friction facings of said torque limiter have a median diameter greater than the median diameter of these of said friction disk.

6. Clutch comprising a flywheel adapted to be constrained to rotate with a first shaft, a friction disk adapted to be constrained to rotate with a second shaft, a clutch cover constrained to rotate with said flywheel, a pressure plate constrained to rotate with said cover and movable axially relative to said cover, and axially acting spring means which bear on said cover and are adapted to urge said pressure plate towards said flywheel for clamping said friction disk against said flywheel, said cover having a bearing surface, said flywheel comprising first and second parts rotatable relative to each other and circumferentially acting spring means adapted to resist such relative rotation, said first part being adapted to be constrained to rotate with said first shaft and comprising a flange constituting a support flange for the clutch, said second part, against which said friction disk is adapted to bear axially, comprising a plate constituting the reaction plate proper and, a torque limiter comprising friction facings and axially acting spring means for clamping up said friction facings, said torque limiter being operative between said plate and said bearings surface on said cover, said axially acting spring means associated with said friction disk also constituting said axially acting spring means associated with said friction facings of said torque limiter, and said friction facings of said torque limiter and said friction facings of said friction disk having different coefficients of friction.

* * * * *